March 31, 1931.  F. E. RILEY  1,798,498
LUBRICATED VALVE
Filed Oct. 30, 1929   2 Sheets-Sheet 1
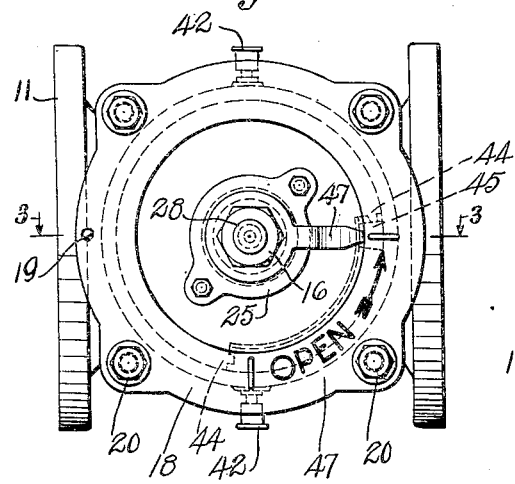
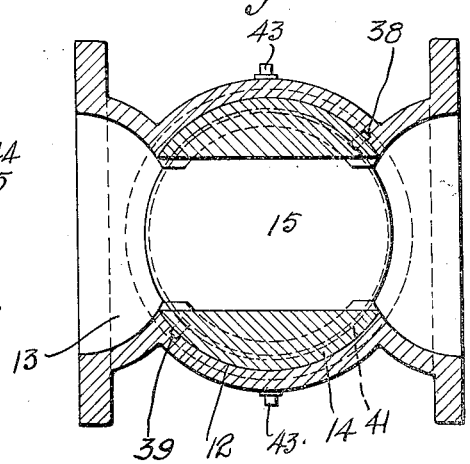
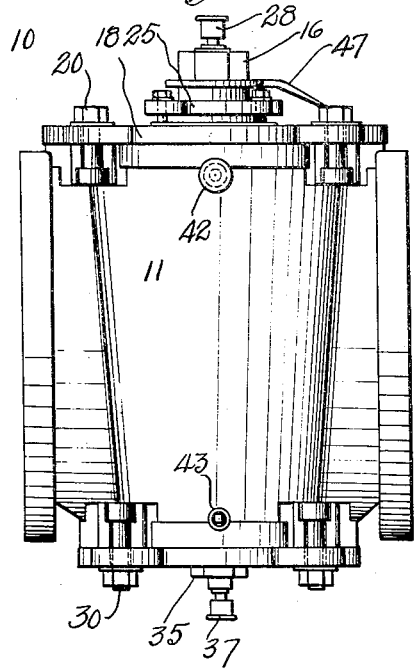
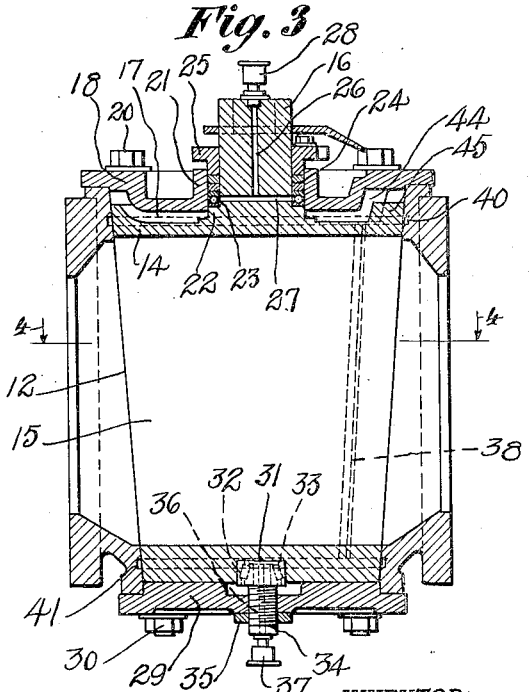
INVENTOR
Frederic Edwin Riley
BY Beeler & Schumacher
ATTORNEYS

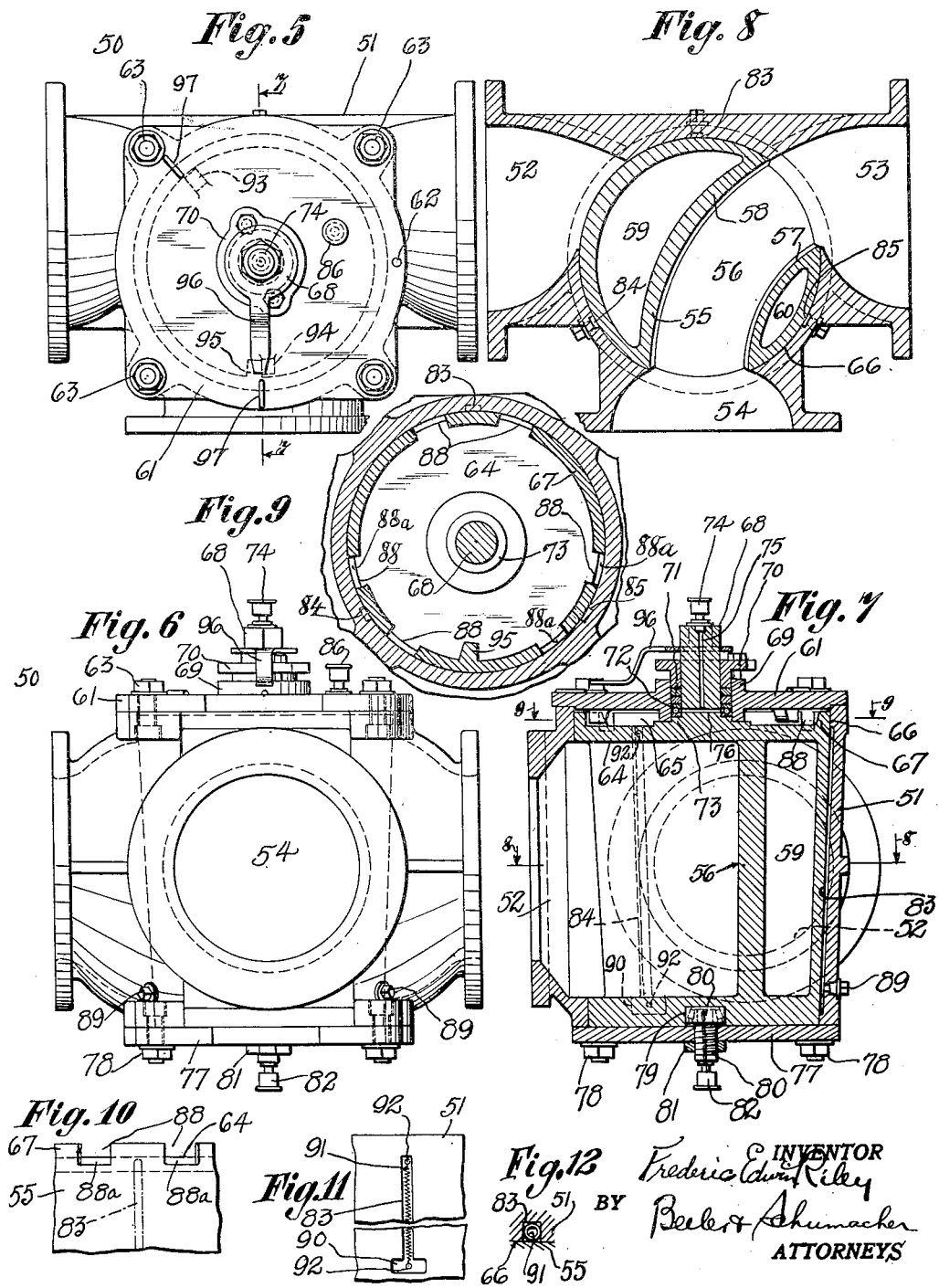

Patented Mar. 31, 1931

1,798,498

UNITED STATES PATENT OFFICE

FREDERIC EDWIN RILEY, OF LIVERMORE FALLS, MAINE, ASSIGNOR TO RECORD FOUNDRY & MACHINE CO., OF LIVERMORE FALLS, MAINE, A CORPORATION OF MAINE

LUBRICATED VALVE

Application filed October 30, 1929. Serial No. 403,428.

This invention relates to lubricated valves and has among its objects the provision of a device of the character described in which the surface of contact between the plug and valve casing is lubricated in an improved manner.

Another object of the invention is to construct a device of the nature set forth in which an improved positive feed system supplies lubricant to the surface of contact between the plug and valve casing, but the said lubricant being cut off at predetermined points in the operation of the valve to tend to prevent the lubricant from being discharged in any appreciable amount into the valve casing, with a consequent loss of lubricant, and possible clogging of the valve or coacting devices.

Among the applications of a valve of this type is in the chemical industries, where it is required that a chemical injurious to the lubricant shall not come into any considerable mass contact therewith; but the invention is also intended to embrace all other uses for which it is adapted.

Another object of the invention is to construct an improved lubricating system which is equally applicable to two as well as three way valves, and any other types of fluid controlling devices in which it is desired to reduce the friction incident to the operation of the valve.

Another object of the invention is to furnish an improved device of the character described in which the plug is supported in an improved manner by a bearing to reduce frictional resistance.

Another object of the invention is to construct a device of the nature alluded to having improved means to substantially retain the lubricant in certain of the channels therefor, which by reason of the turning of the plug are exposed, with the result that the lubricant would otherwise be free to flow out of said channels and be lost in the valve.

Another object of the invention is to produce a valve of the type mentioned in which the lubricant supply to the channels is cut off in the closed and open positions of the valve, and in communication only during the turning of the plug from one position to another position.

An advantage of causing the lubricant to be cut off in the closed position of the valve is that if the plug be raised slightly from its seat, any tendency for the occurance of leakage of lubricant will be avoided, it being noted that by this invention the lubricant is supplied to the channels only during the relatively momentary opening or closing of the valve.

Further objects of the invention are to provide a valve of simplified construction, which is relatively inexpensive to manufacture, rugged in construction, and reliable and efficient to a high degree in use.

Other objects and advantages of the invention will become apparent as the specification proceeds.

With the aforesaid objects in view, the invention consists in the novel combinations and arrangements of parts hereinafter described in their preferred embodiments, pointed out in the subjoined claims, and illustrated on the annexed drawing, wherein like parts are designated by the same reference characters throughout the several views.

Fig. 1 is a top plan view of a device embodying the invention.

Fig. 2 is a view in side elevation of the same.

Fig. 3 is a vertical sectional view taken on line 3—3 of Fig. 1.

Fig. 4 is a horizontal sectional view taken on line 4—4 of Fig. 3.

Fig. 5 is a top plan view of a modification.

Fig. 6 is a view in side elevation thereof.

Fig. 7 is a view in vertical section taken on line 7—7 of Fig. 5.

Figs. 8 and 9 are horizontal sectional views taken on lines 8—8 and 9—9, respectively, of Fig. 7.

Figs. 10 and 11 are fragmentary views in elevation of the valve plug and valve casing respectively.

Fig. 12 is a horizontal sectional view of a detail of invention.

The advantages of the invention as here outlined are best realized when all of its features and instrumentalities are combined in one and the same structure, but useful devices may be produced embodying less than the whole.

It will be obvious to those skilled in the art to which this invention appertains, that the same may be incorporated in several different constructions; the accompanying drawing, therefore, is submitted merely as showing the preferred exemplification of the invention.

Generally described, the invention provides a tapered plug valve having means to supply lubricant under pressure to the bearing or contacting surface of the plug and valve casing to reduce frictional resistance. A plurality of channels are formed in the said surface, which extend lengthwise of the plug. The lubricant is controlled to prevent it from being discharged from the lubricant reservoir through the channels into the valve casing, the object being to conserve the lubricant solely for the bearing surface. Preferably the said channels are entirely out of communication with the interior of the valve, the turning of the plug being limited by suitable stop means. This may be readily accomplished in a two way valve, but cannot be done without undue complication in a three way valve. Therefore, in the latter, the supply of lubricant to the channels is cut off, and this cut off may be accomplished in any suitable manner, as, for instance, by the seating surface of the valve. It is preferred that the arrangement be such as to cut off the lubricant when the valve is fully open and fully closed. The lubricant is thus supplied from the reservoir to the channels only during the opening or closing of the valve. The valve naturally remains in open or closed position much longer than in an intermediate position. Consequently, where the plug is raised off its seat, as, for example, by a thrust supporting bearing, there is less liability to leakage. To retain the lubricant in the channels when the same are exposed, perforated means, or a coil spring may be positioned therein, the latter being adjustable to suit the operating conditions. Suitable drainage means may coact with the channels.

Referring in detail to the drawing, 10 denotes a device embodying the invention. The same includes a valve casing 11 having a tapered seat 12 therein and a transverse passage 13 intersecting the same. Positioned in the seat 12 is a plug 14 having a transverse opening 15 adapted to communicate with said transverse passage. The said plug may have a head 16 whereby it is turned. Extending over the plug in spaced relation thereto at 17 is a closure plate 18 for the valve casing. The same is positioned in predetermined relation by a setting pin 19, or the like, and secured in place by bolts 20. Centrally of the closure plate, an annular flange 21 is provided in which is received an alined upstanding shoulder portion 22 of the plug.

To cause the plug to be reliably retained in its seat, without undue friction, a bearing 23 is positioned within the flange 21 on the said shoulder 22. On the bearing is packing 24, and bearing on the packing is a gland 25. By this, or any equivalent construction, an axial pressure is exerted on the plug to cause the same to seat with any desired degree of snugness or clearance, as the case may be. Other means hereinafter described may coact at the other end of the plug for this purpose, thus rendering the valve independent of the fluid pressure or of the angular position of the valve.

To lubricate the bearing 23, longitudinal and cross channels 26, 27 are provided, the former being in communication with a lubricant cup 28. This may be of any suitable type and may be adapted to feed the lubricant by pressure.

At the lower end of the valve is any plate 29 which is secured in place by bolts 30. This plate may have any desired relation with the plug 14, but has preferably a limited clearance therewith. To reduce friction, a central thrust bearing 31 is used, the same being mounted in any desired manner. The bearing may assume various forms and includes, for instance, a frusto conical seat 32, and rollers 33, whose axes lie along a cone.

Carrying the bearing 31 is an adjusting means such as a screw 34 that is threaded in the plate 29 and locked therewith by a suitable locknut 35. Extending centrally of the said screw is a passage 36, with which communicates lubricant pressure cup 37 to lubricate bearing 31.

The adjusting means at the upper and lower ends of the valve may coact to accurately position the plug in predetermined relation with its seat, and to permit operation of the valve with little friction.

Extending along the seating surface of the valve are longitudinal channels 38, 39. These are positioned in diametrically opposite relation, each being in relative proximity to the passage 13, but in spaced relation thereto. Interconnecting the said channels and supplying lubricant thereto are any suitable transverse channels 40 and 41 which are wholly at the upper and lower ends of the seating surface. Supplying lubricant to the upper transverse channel are one or more pressure cups 42. To drain the channels of lubricant, the transverse channel 41 has drain plugs 43. It will be understood that the cups 42 and drain plugs 43 may also communicate directly with the longitudinal passages 38, 39. If the valve be mounted with the larger end of the plug lowermost, the lubricant cups 42 and the drain plugs 43 may be reversed.

In the position of the valve shown in Fig.

4 it is seen that the channels 38, 39 are wholly enclosed by the plug 14. To close the valve, the same is preferably turned in clockwise direction, causing the longitudinal channels to remain enclosed. To avoid the possibility of the plug 14 being turned in the opposite direction and exposing the longitudinal channels, a suitable stop means is utilized. This may include stop members 44 formed on the underside of the plate 18 and extending into the clearance space 17 to coact with a stop lug 45 on the plug 14. On the outside of the plate 18, indicating means 46 may be provided, and this may include a pointer 47 fixed to the head 16 of the plug.

In Figs. 5 to 11 is shown a modification of the invention including a valve 50 of a two way type. The same includes a valve casing 51 having a pair of alined ports 52, 53, and a port 54 at an angle thereto. Within the valve casing is a valve 55 of any suitable type, as for instance, a plug valve, and this may be tapered if desired. The said valve may have an angular opening 56 therethrough, which may communicate with any of the ports. The valve may, however, be designed for a flow in a right or left direction only, and the several ports and passages may be streamlined as shown. As constructed, the valve 55 possesses a maximum of strength, and is well adapted to take up the stresses created thereon by the pressure of the fluid. The passage 56 divides the valve into a small section 57 and a large section 58, the latter efficiently spanning the port 52. The valve may be made hollow as shown at 59, 60.

It will be understood that while a particular type of valve and valve casing have been shown herein, the invention is not to be limited thereto, but certain features of improvement may be practiced with two and three way valves. Thus the lubricating system hereinafter described may be used in a two way valve.

Closing the upper end of the valve casing is a closure plate 61 which is positioned with the aid of a set pin 62 and is secured by bolts 63. The said closure plate is in spaced relation to the upper wall portion 64 of the plug valve, forming a space or lubricant reservoir 65. Along the seating surface 66 of the valve is a flange 67 extending upward into the space 65, for a purpose hereinafter described.

Centrally of the plug valve is a head 68 extending through a suitable hub 69 in the closure plate 61. A gland 70 and packing 71 render the opening fluid tight. To avoid undue frictional resistance, a bearing 72 is provided between the said packing and a shoulder 73 on the plug valve. The said bearing may be lubricated by any pressure cup 74 supplying lubricant through the head 68 by means of longitudinal and cross passages 75 and 76.

Closing the lower end of the valve casing is a closure plate 77 which is secured in any suitable manner to the valve casing, as by means of bolts 78. The plate 77 may have any desired or a minimum of clearance with the plug valve. In alinement with the latter is a thrust bearing 79 of any suitable type, as for instance, a roller bearing. The same may be adjustably actuated by a screw, 80, or the like which may be positively engaged with the bearing. The screw may be threaded in the plate 77 and locked by a locknut 81. A suitable pressure cup 82 may feed lubricant to the bearing 79 through a central passage 80 in the screw.

The upper and lower bearings 72 and 79 coact for predetermining the position of the valve, and also reduce friction in the operation of the valve. The plug valve may be maintained at its slight clearance with its seat, particularly if a heavy lubricant be used. The degree of finish for the seating surface of the valve may be reduced.

To lubricate the seating surface of the valve a plurality of longitudinally extending passages, as for instance, 83, 84, 85 are provided in the said surface. These may be disposed in various ways, but according to one possible embodiment, terminate in spaced relation to the ends of the seating surface. Lubricant may be supplied to the passages in any suitable manner from separate sources or a single source. It is desired that the supply of lubricant be cut off when a passage is exposed by the valve plug. Thus, if the latter be turned clockwise from the position shown in Fig. 8, passages 84 and 85 would be exposed by the opening 56 of the valve plug.

A suitable pressure cup 86 may supply lubricant to the reservoir 65. From there the lubricant may be fed in any desired manner to the passages 83, 84, 85 and cut off at any required point by any suitable member actuated coincident with the operation of the valve, but preferably by the seating surface itself. Thus I may provide openings 88 in the flange 67 recessed at 88a, these openings being of elongated form in a transverse direction, and spaced in any desirable manner to communicate intermittently with the longitudinal passages 83, 84, 85. Thus a pair of the transverse passages may be provided for each longitudinal passage and spaced on opposite sides thereof in any full open or closed position of the valve. Thus the longitudinal passages are cut off from the lubricant pressure supply in the full open, or in the full closed position, or in both positions, depending upon the valve construction and the manner of operation thereof. When the valve plug 55 is being turned to open or close a valve passage, the transverse passages come into communication with the longitudinal passages.

The time during which this communication occurs will depend on the length of the transverse passages and the rate of turning of the valve plug.

Thus no leakage of lubricant is possible while the valve plug is in a position of rest in open or closed position, through the clearance space at the valve seat. It will be understood, however, that the device may be used with advantage even if there is no clearance space, since the supply of lubricant is cut off to the longitudinal channels while the same are exposed.

At the end of each longitudinal passage is a drain plug 89 permitting separate draining and testing of the same. The lower ends of the said passages may, however, terminate in separate transverse passages 90 of any suitable length to amply lubricate the lower end of the seating surface.

To minimize the loss of lubricant from the longitudinal passages during the short time that the same are exposed, any suitable means is disposed therein which may retain all or a portion of this lubricant. The means employed must be inexpensive, reliable and avoid all possibility of interfering with the operation of the valve. Various means may be utilized including porous or perforated elements, but preferably I employ a coil spring 91 within the longitudinal passages and extending therealong. A coil spring provides a tubular device with openings between the turns of wire for the flow of lubricant along outside and inside of the spring, and from the latter to the outside. The lubricant tends to adhere to the spring. As a result, loss of lubricant is avoided. The spring may be readily adjusted as to the size of the spaces between the turns, by varying the tension on the spring. Because the turns are circular, there is no possibility of the valve plug abutting the spring, and the tension thereon assures that the spring will lie snugly in its passage. For mounting the spring, any suitable means, such as pins 92 may be set into the wall of the passage and the spring engaged therewith by loops or the like.

The valve plug 55 may be given a full revolution, or stop means may be provided to limit the movement of the same to a left, or a right flow position. Also the valve may be in an intermediate position for closing all the parts. Suitable indicia may of course be provided to indicate the position of the valve.

The stop means referred to may include stop elements 93, 94 on the closure plate 64 and extending into the space 65. A lug 95 on the valve plug coacts therewith. A pointer 96 may be provided on the head 68 to indicate the valve position in accordance with marks 97.

It will be appreciated that the invention is susceptible of various modifications, and the embodiments shown are intended to be merely illustrative.

I claim:

1. A lubricated valve, including a valve casing, a valve therein, lubricant passages extending longitudinally along the seating surface of the valve, transverse passages in the seating surface, and means to supply a lubricant under pressure to the transverse passages, the transverse passages communicating with the longitudinal passages only in the opening or closing movement of the valve, and being out of communication with the longitudinal passages in the full open or closed positions of the valve.

2. A lubricated valve, including a valve casing, a valve therein, lubricant passages extending longitudinally along the seating surface of the valve, transverse passages in the seating surface, and means to supply a lubricant under pressure to the transverse passages, the transverse passage communicating with the longitudinal passages only in the opening or closing movement of the valve, and being out of communication with the longitudinal passages in the full open or closed positions of the valve, and means to support said valve at any predetermined clearance with the valve seat.

3. A lubricated valve comprising a valve casing part, a valve part therein, longitudinally extending passages in the seating surface of the valve, transverse passages spaced from the longitudinal passages in the full open or closed positions of the valve, said longitudinal passages being in one of the parts and the transverse passages in the other part, the longitudinal passages communicating with the transverse passages in opening or closing the valve.

4. A lubricated valve including a valve casing, a valve therein, passages in the seating surface of the valve, means to supply lubricant to said passages, and coil springs in said passages extending therealong to retain the lubricant in said passages.

In testimony whereof I affix my signature.

FREDERIC EDWIN RILEY.